D. Rankin.
Water Wheel.
No. 277. Reissued Sept. 26, 1854
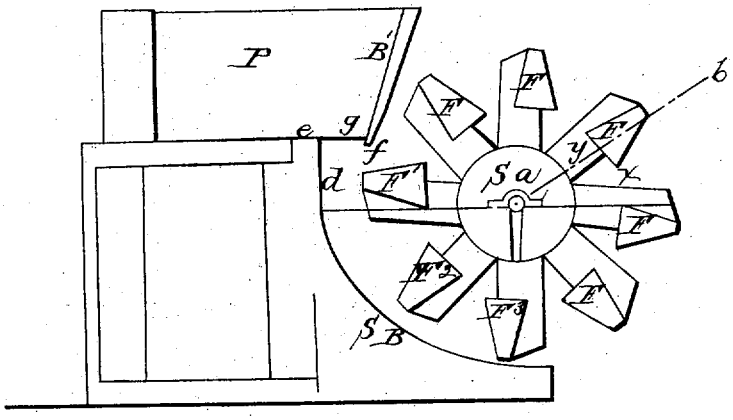
N. PETERS, PHOTO-LITHOGRAPHER, WASHINGTON, D. C.

UNITED STATES PATENT OFFICE.

DAVID RANKIN, OF AUGUSTA COUNTY, VIRGINIA.

IMPROVEMENT IN THE METHOD OF APPLYING WATER TO COMPOUND BUCKETS OF FLUTTER-WHEELS.

Specification forming part of Letters Patent No. 11,255, dated July 11, 1854; Reissue No. 277, dated September 26, 1854.

*To all whom it may concern:*

Be it known that I, DAVID RANKIN, of Augusta county, in the State of Virginia, have invented certain new and useful Improvements in the Construction and Arrangement of Chutes and Flutter Water-Wheels; and I do hereby declare the following to be a full, clear, and exact description of the same, reference being had to the accompanying drawing, making a part thereof, and which represents a side view of the flutter-wheel and a section through the forebay.

The nature of my invention relates to the cuniform shape of the floats or buckets and their arrangement with regard to an eccentric water-way or chute-board, so that the water shall act on at least three buckets in the proportions of about one-sixth or sixteen and two-thirds per cent. on the first, four-sixths or sixty-six and two-thirds per cent. on the second, and one-sixth or sixteen and two-thirds per cent. on the third or last bucket, which last bucket should but barely escape the bottom of the chute-board at the point where the power of the water is exhausted.

To enable others skilled in the art to make and use my invention, I will proceed to describe the same with reference to the drawing.

S is the shaft of the wheel, which may be of wood or iron, or both, as may be found essential, and which is provided with any suitable number of radial arms for carrying the floats or buckets F $F'$ $F^2$ $F^3$, &c. The floats or buckets F are cuniform or wedge-shaped, and so let into the ends of the arms that their inclined sides, which receive the water, shall stand as nearly at right angles to the column of descending water as can be safely done, and prevent the water from running to the center of the wheel.

In the general construction of flutter-wheels and their chutes heretofore the forebay overhung the wheel, and the water-way was concentric with the wheel. In this mode of construction the bucket on the horizontal arm closed up the water-way and destroyed the action of the water on the bucket in advance of it.

I make my chute-board S B eccentric with the wheel, so that the bucket on the horizontal arm $F'$ shall take about one-sixth or sixteen and two-thirds per cent. of the volume of water, the one in advance of this, $F^2$, taking about four-sixths or sixty-six and two-thirds per cent., and the next in advance, $F^3$, taking the remaining one-sixth or sixteen and two-thirds per cent., of the volume. I find that this arrangement and these proportions produce the most desirable results. The line *a b*, drawn from the center of the wheel through the corner of the bucket, will represent its position on the arm and how they are set thereon.

P represents the forebay or penstock, and B the breast-board. The point *f* of the breast-board projects slightly below the bottom of the penstock, *e g* representing the line of said bottom.

The chute-board may be perpendicular from *e* to *d;* but from *d* to its extreme end it curves around eccentrically in relation to the wheel until, at a point about perpendicular from the center of the wheel, the last float or bucket acting shall just escape it in passing.

The proportions of the wheel generally and of the chute may be varied to suit the head and fall of water, the rules for which are laid down in the elementary books on this subject, and need not here be repeated.

Having thus fully described the nature of my invention, what I claim therein as new, and desire to secure by Letters Patent, is—

The so arranging of cuniform buckets upon the radial arms of flutter-wheels as that in passing through an eccentrically-formed water-way three buckets shall receive the volume of water in about the proportions herein described and represented.

DAVID RANKIN.

Witnesses:

HUGH W. SHEFFEY,

H. M. BELL.